United States Patent
Chen et al.

(10) Patent No.: US 9,897,856 B2
(45) Date of Patent: Feb. 20, 2018

(54) DISPLAY PANEL, MANUFACTURING METHOD THEREOF AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaochuan Chen, Beijing (CN); Shijun Wang, Beijing (CN); Lei Wang, Beijing (CN); Wenbo Jiang, Beijing (CN); Yanna Xue, Beijing (CN); Yue Li, Beijing (CN); Zhiying Bao, Beijing (CN); Wenjun Xiao, Beijing (CN); Zhenhua Lv, Beijing (CN); Yong Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/124,960

(22) PCT Filed: Nov. 5, 2015

(86) PCT No.: PCT/CN2015/093902
§ 371 (c)(1),
(2) Date: Sep. 9, 2016

(87) PCT Pub. No.: WO2016/197530
PCT Pub. Date: Dec. 15, 2016

(65) Prior Publication Data
US 2017/0176800 A1    Jun. 22, 2017

(30) Foreign Application Priority Data
Jun. 11, 2015 (CN) .......................... 2015 1 0320668

(51) Int. Cl.
*G02F 1/1335* (2006.01)
*G02F 1/13363* (2006.01)
(Continued)

(52) U.S. Cl.
CPC ........ *G02F 1/13363* (2013.01); *G02F 1/1368* (2013.01); *G02F 1/13439* (2013.01);
(Continued)

(58) Field of Classification Search
CPC ........... G02F 1/13363; G02F 1/133512; G02F 1/134309; G02F 1/1368;
(Continued)

(56) References Cited

U.S. PATENT DOCUMENTS 6,329,106 B1 * 12/2001 Bae .......................... G03F 1/32
                                                                      204/192.34
9,261,707 B2 * 2/2016 Ryu ........................ G02B 27/22
(Continued)

FOREIGN PATENT DOCUMENTS

CN        1534331 A        10/2004
CN        1871543 A        11/2006
(Continued)

OTHER PUBLICATIONS

International Search Report and Written Opinion dated Feb. 19, 2016; PCT/CN2015/093902.
(Continued)

*Primary Examiner* — Hoan C Nguyen
(74) *Attorney, Agent, or Firm* — Ladas & Parry LLP

(57) ABSTRACT

A display panel and a manufacturing method thereof and a display device are provided. The display panel includes an array substrate and an opposed substrate that are opposite to each other, and a liquid crystal layer located between the array substrate and the opposed substrate. The display panel includes a display area and a non-display area, a phase shift layer is disposed at the non-display area of the array substrate, and the phase shift layer is configured to shift a phase of light passing through the phase shift layer. The display panel is used to solve color cast problem when a TFT-LCD (Continued)

displays a pure color, which is caused by cross color when the display panel is viewed at a side angle.

19 Claims, 5 Drawing Sheets

(51) Int. Cl.
*G02F 1/1343* (2006.01)
*G02F 1/1368* (2006.01)
*G02F 1/1333* (2006.01)

(52) U.S. Cl.
CPC .. *G02F 1/133512* (2013.01); *G02F 1/134309* (2013.01); *G02F 2001/133388* (2013.01); *G02F 2001/133565* (2013.01); *G02F 2201/121* (2013.01); *G02F 2201/123* (2013.01); *G02F 2413/01* (2013.01)

(58) Field of Classification Search
CPC ........ G02F 2001/133388; G02F 2001/133565; G02F 2201/121; G02F 2201/123; G02F 2413/01
See application file for complete search history.

(56) References Cited

U.S. PATENT DOCUMENTS

| | | | |
|---|---|---|---|
| 2007/0229737 A1 | 10/2007 | Takeda | |
| 2007/0291205 A1 | 12/2007 | Hsu et al. | |
| 2009/0066890 A1* | 3/2009 | Harding | G02F 1/133555 349/106 |
| 2016/0372701 A1* | 12/2016 | Kwon | H01L 51/5246 |

FOREIGN PATENT DOCUMENTS

| | | | |
|---|---|---|---|
| CN | 103454850 A | | 12/2013 |
| CN | 104765216 A | | 7/2015 |
| CN | 104849925 A | | 8/2015 |
| KR | 2009051981 | * | 5/2009 |
| KR | 1020130043016 A | | 4/2013 |
| TW | 200801687 A | | 1/2008 |

OTHER PUBLICATIONS

The First Chinese Office Action dated May 11, 2017; Appln. No. 201510320668.9.

* cited by examiner

DISPLAY PANEL, MANUFACTURING METHOD THEREOF AND DISPLAY DEVICE

TECHNICAL FIELD

At least one embodiment of the present invention relates to a display panel, a manufacturing method thereof and a display device.

BACKGROUND

Recent years, with the development of digit televisions, ordinary cathode ray tube (CRT) display technique with disadvantages, such as being difficult to digitize, large volume, big weight, and radiation, is gradually replaced by a new display technique. Liquid crystal displays (LCDs) have advantages such as light weight, small volume, lower consumption, being free of radiation, and high display resolution, and have become mainstream products in display field.

A LCD includes a display panel distributed a plurality of thin film transistors (TFTs), a source driver IC with a data line to drive a source electrode of a TFT, a gate driver IC with a gate line to drive a gate electrode of a TFT, and a backlight module. One TFT corresponds to one sub-pixel on a display panel, each TFT is connected with a pixel electrode, the pixel electrode and a common electrode form an electrical field to control charging and discharging of a sub-pixel corresponding to the TFT.

SUMMARY

At least one embodiment of the invention provides a display panel and a manufacturing method thereof and a display device to solve color cast (color deviation) problem when a TFT-LCD displays a pure color, which is caused by cross color when the display panel is viewed at a side angle.

At least one embodiment of the invention provides a display panel comprising an array substrate and an opposed substrate that are opposite to each other, and a liquid crystal layer located between the array substrate and the opposed substrate, wherein the display panel comprises a display area and a non-display area, a phase shift layer is disposed at an area corresponding to the non-display area of the array substrate, and the phase shift layer is configured to allow shift a phase of light passing through the phase shift layer.

For example, in the display panel provided by an embodiment of the invention, a black matrix is disposed at the non-display area, and an orthographic projection of the phase shift layer on the array substrate coincides with an orthographic projection of the black matrix at the non-display area on the array substrate.

For example, in the display panel provided by an embodiment of the invention, the phase shift layer is located above all layers at a side of the array substrate close to the liquid crystal layer.

For example, in the display panel provided by an embodiment of the invention, a common electrode is disposed on the opposed substrate, a pixel electrode is disposed on the array substrate, and the phase shift layer is located on a layer where the pixel electrode is located.

For example, in the display panel provided by an embodiment of the invention, the phase shift layer is insulated from the pixel electrode, and a bias voltage is applied to the phase shift layer to drive liquid crystals in an area covered by the phase shift layer to rotate.

For example, in the display panel provided by an embodiment of the invention, a first transparent electrode and a second transparent electrode are disposed on the array substrate, the first transparent electrode is away from the liquid crystal layer, the second transparent electrode is close to the liquid crystal layer, the phase shift layer is located on the second transparent electrode.

For example, in the display panel provided by an embodiment of the invention, the first transparent electrode is a pixel electrode, the second transparent electrode is a common electrode, or the first transparent electrode is a common electrode, the second transparent electrode is a pixel electrode.

At least one embodiment of the invention provides a display device comprising one of the above-mentioned display panels.

At least one embodiment of the invention provides a manufacturing method of the display panel comprising: forming an array substrate, and forming a phase shift layer on the array substrate, the phase shift layer being located at a non-display area of the array substrate and configured to shift a phase of light passing through the phase shift layer; forming an opposed substrate, and cell-assembling the array substrate with the phase shift layer formed thereon and the opposed substrate.

For example, in the manufacturing method of the display panel provided by an embodiment of the invention, forming the array substrate comprises: providing a first base substrate; forming a thin film transistor on the first base substrate; forming a pixel electrode layer on the thin film transistor; forming a phase shift layer on the pixel electrode layer; and forming the opposed substrate comprises: providing a second base substrate; forming a common electrode layer on the second base substrate.

For example, in the manufacturing method of the display panel provided by an embodiment of the invention, forming the array substrate comprises: providing a first base substrate; forming a thin film transistor on the first base substrate; forming a first transparent electrode layer on the thin film transistor; forming a second transparent electrode layer on the first transparent electrode layer; forming a phase shift layer on the second transparent electrode layer.

For example, in the manufacturing method of the display panel provided by an embodiment of the invention, a first transparent electrode is a pixel electrode, a second transparent electrode is a common electrode, or a first transparent electrode is a common electrode, a second transparent electrode is a pixel electrode.

For example, in the manufacturing method of the display panel provided by an embodiment of the invention, a material of the phase shift layer is MoSiON.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 1c is a top schematic view of an array substrate at area "C" indicated by a dotted frame of a TFT-LCD in FIG. 1a;

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1A:
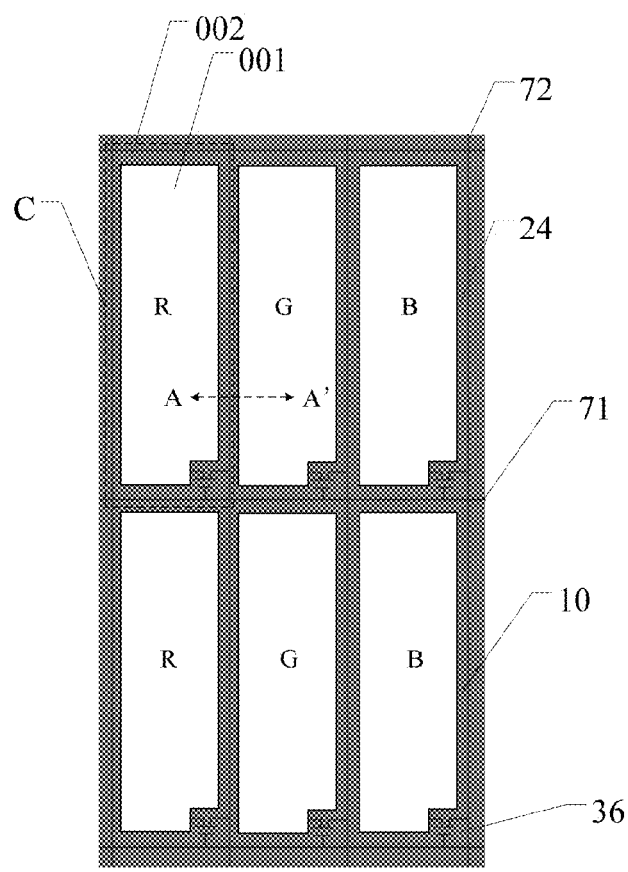
FIG. 1a is a top schematic view of a display panel of a TFT-LCD.
Figure 1B:
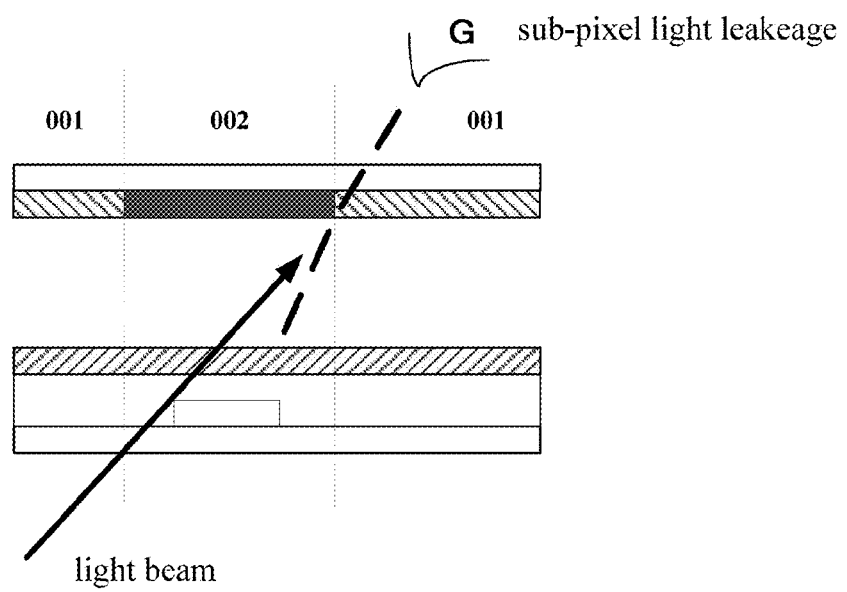
FIG. 1b is a schematic view of a display panel of a TFT-LCD generating light leakage.

FIG. 1a illustrates a top schematic view of a display panel of a TFT-LCD, the display panel includes a display area 001 and a non-display area 002. The display panel includes an array substrate 41 and an opposed substrate 42 that are opposite to each other, and a liquid crystal layer 50 (as illustrated in FIG. 1b) located between the array substrate and the opposed substrate. The display area 001 and the non-display area 002 on the opposed substrate 42 correspond to the display area 001 and the non-display area 002 on the array substrate 41, respectively. The display area 001 is configured to emit or transmit light, the non-display area 002 is configured to divide the display area, and the following embodiments can be the same as that.

For example, as illustrated in FIG. 1a, the array substrate includes a plurality of gate lines 71 and a plurality of data lines 72, the gate lines 71 intersect and are insulated from the data lines 72. For example, the gate lines 71 extend along a lateral direction, the data lines 72 extend along a vertical direction. For example, the gate lines 71 intersect the data lines 72 to define a plurality of sub-pixels 10. For example, a sub-pixel 10 further includes a switching element and a pixel electrode 24 connected with the switching element. For example, the switching element is a thin film transistor 36.

It is to be noted that, sub-pixels 10 can be defined by a plurality of gate lines 71 and a plurality of data lines 72, and limitations are not imposed thereto. For example, a sub-pixel 10 includes a gate line, a data line, a pixel electrode and a switching element. A sub-pixel 10 is the minimum unit to display in the array substrate or the opposed substrate. For example, the display area 001 corresponds to an area to emit or transmit light of a plurality of sub-pixels. A non-display area 002 is disposed between two adjacent sub-pixels.

It is to be noted that, the display area 001 and the non-display area 002 in the embodiments of the present invention correspond to microscopic structure of the display panel. In practical application, the microscopic display area 001 and the microscopic non-display area 002 are hard to be separated by human eyes, the display area 001 and the non-display area 002 form an image display area (picture displaying area) of a display panel.

FIG. 1b illustrates a sectional schematic view of a TFT-LCD. In a display process of a TFT-LCD, because light is transmitted and refracted, and different materials are provided with different light transmission rates and different indexes of refraction with regard to different wavelengths. For example, a pixel unit includes a plurality of sub-pixels to display different colors to realize color display. For example, a pixel unit in an array substrate of a TFT-LCD can includes a red sub-pixel, a green sub-pixel, and a blue sub-pixel, which can be labeled with R, G, B, respectively. In a process of performing a picture display of a TFT-LCD, in a case that light emitted by a backlight source is vertically incident on an array substrate of a TFT-LCD, light can be reflected directly. In a case that light emitted by a backlight source is incident on an array substrate at an inclined angle, because of an incident angle, light is reflected or transmitted after being incident on an array substrate. In this case, a problem of color cross arises at a side viewing angle of a TFT-LCD. As illustrated in FIG. 1b, a green sub-pixel leaks light (for example, G sub-pixel of FIG. 1b leaks light). Therefore, color cast arises when a TFT-LCD displays a pure color.

It is to be noted that, a pixel can include a red sub-pixel, a green sub-pixel, and a blue sub-pixel, and limitations are not imposed thereto. Moreover, an arrangement of sub-pixels is not limited to an array arrangement in which sub-pixels in each column and each row are aligned. For example, sub-pixels in each column and each row can also be staggered by such as a half width or height of a sub-pixel.

Figure 1C:
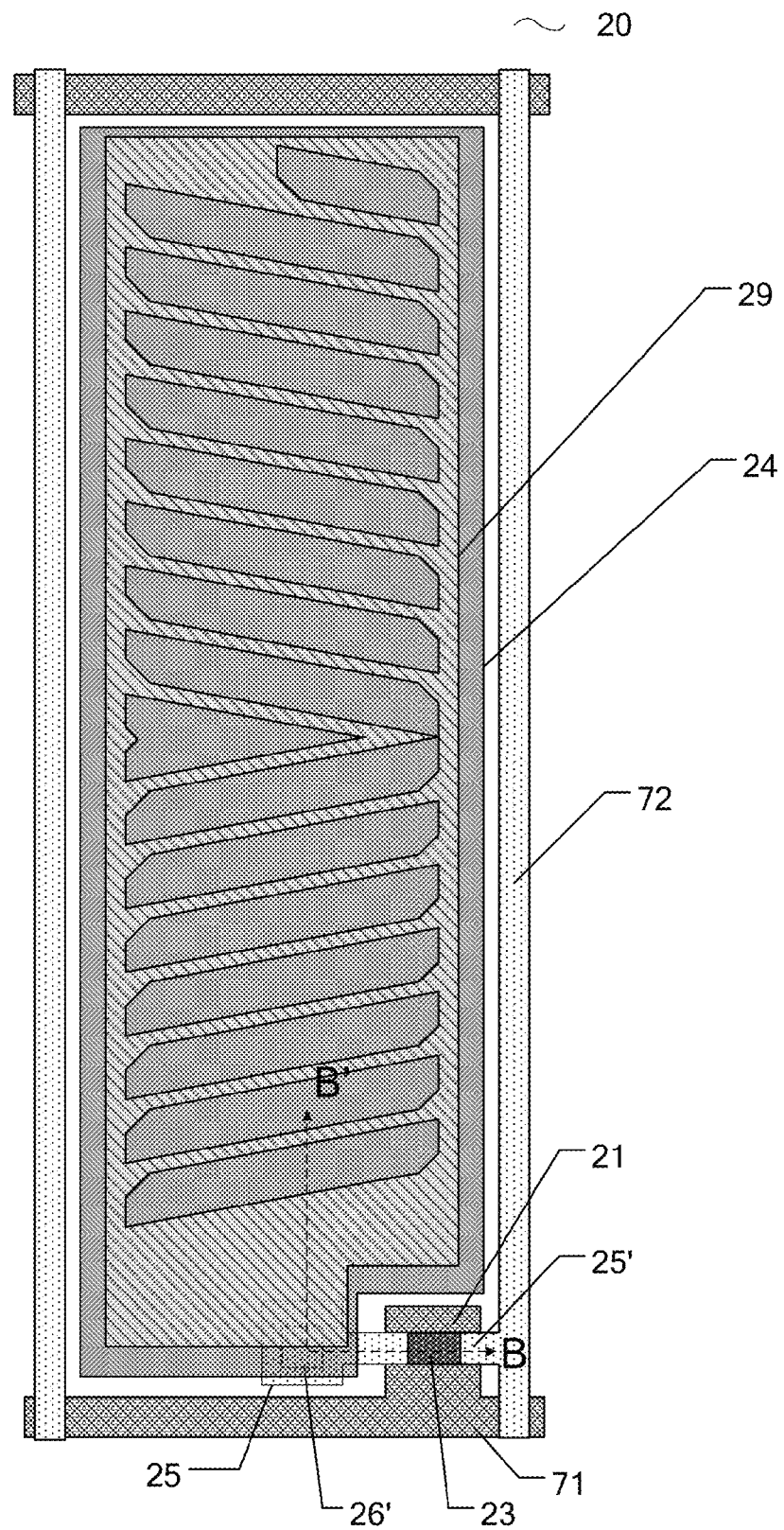

FIG. 1c is a top schematic view of an array substrate at an area "C" indicated by a dotted frame of a TFT-LCD in FIG. 1a. A plate-shaped pixel electrode 24 is electrically connected with a drain electrode 25 through a via hole 26'. A slit-shaped common electrode 29 is insulated from the pixel electrode 24, and is disposed on a layer where the pixel electrode 24 is located. For example, a gate line 71 can be formed in the same layer with a gate electrode 21, and a source electrode 25' can be formed in the same layer with a data line 72. FIG. 1c also illustrates an active layer 23.

At least one embodiment of the present invention provide a display panel comprising an array substrate and an opposed substrate that are opposite to each other, and a liquid crystal layer located between the array substrate and the opposed substrate. The display panel includes a display area and a non-display area, a phase shift layer is disposed at an area corresponding to the non-display area of the array substrate, the phase shift layer is configured to allow light passing through the phase shift layer to undergo phase shift.

A phase shift layer is disposed at an area corresponding to the non-display area of the display panel, the phase shift layer is configured to allow light beam incident thereon to undergo phase shift. In a display panel with a phase shift layer provided in a non-display area, light is reflected and transmitted after being incident on a lower substrate of a display panel, the phase shift layer can shift the phase of light which is reflected and transmitted. Therefore, energy (light strength) of light beam after being shifted in phase and energy (light strength) of light beam before being shifted in phase counteract each other, therefore, a problem of light leakage is avoided, and a problem of color cast when a TFT-LCD displays a pure color picture is solved.

For example, in a display panel of an embodiment of the present invention, a black matrix is disposed at the non-display area, and an orthographic projection of the phase shift layer on the array substrate coincides with an orthographic projection of the black matrix at the non-display area on the array substrate.

For example, in a display panel of an embodiment of the present invention, the phase shift layer is located above all layers at a side of the array substrate close to the liquid crystal layer.

For example, in a display panel of an embodiment of the present invention, a common electrode is disposed on the opposed substrate, a pixel electrode is disposed on the array substrate, and the phase shift layer is located on a layer where the pixel electrode is located.

For example, in a display panel of an embodiment of the present invention, the phase shift layer is insulated from the pixel electrode, and a bias voltage is applied to the phase shift layer to drive liquid crystals in an area covered by (corresponding to) the phase shift layer to rotate.

For example, in a display panel of an embodiment of the present invention, a first transparent electrode and a second transparent electrode are disposed on the array substrate, the first transparent electrode is away from the liquid crystal layer, the second transparent electrode is close to the liquid crystal layer, the phase shift layer is located on the second transparent electrode.

For example, in a display panel of an embodiment of the present invention, the first transparent electrode is a pixel electrode, the second transparent electrode is a common electrode, or the first transparent electrode is a common electrode, the second transparent electrode is a pixel electrode.

Embodiments are given as follows to further illustrate.

First Embodiment

Figure 2A:
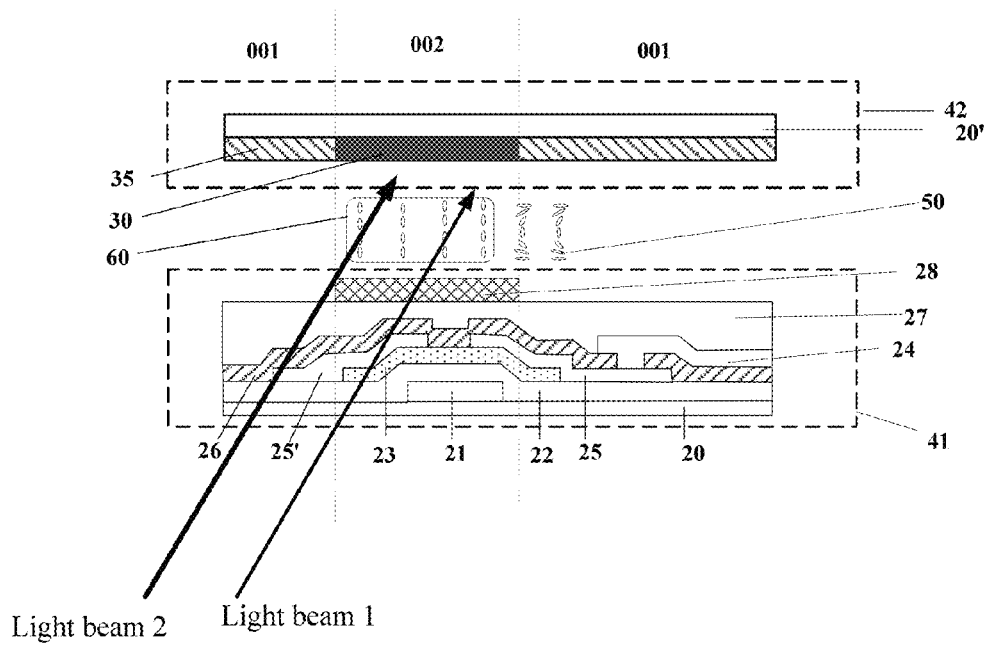
FIG. 2a is a sectional structure schematic view of a display panel provided by an embodiment of the invention.

As illustrated in FIG. 2a, a display panel comprises an array substrate 41 and an opposed substrate 42 that are opposite to each other, and a liquid crystal layer 50 located between the array substrate 41 and the opposed substrate 42. The display panel includes a display area 001 and a non-display area 002 (can also refer to FIG. 1a), a phase shift layer 28 is disposed at an area corresponding to the non-display area of the array substrate 41, the phase shift layer 28 is configured to allow light passing through the phase shift layer to undergo phase shift.

When a display panel displays pictures, as illustrated in FIG. 2a, suppose light beam 1 and light beam 2 are incident on the non-display area 002 of the display panel, light beam 1 is irradiated on the phase shift layer, phase of the light beam 1 changes, light beam 2 does not pass through the phase shift layer, therefore, phase of the light beam 2 does not change. Therefore, energy (light strength) of light beam 1 which changes in phase and energy (light strength) of light beam 2 which does not change in phase counteract each other. Area of reference numeral 60 presents energy counteraction area, therefore, a problem of light leakage does not arise, and a problem of color cast when a TFT-LCD displays a pure color picture is solved. Even if an alignment error arises in a cell-assembling process, a problem of light leakage can also be solved by the phase shift layer.

For example, in the display panel provided by the embodiment, a phase shift layer 28 is disposed at the non-display area 002 of the display panel, and the phase shift layer 28 is configured to allow light passing through the phase shift layer to undergo phase shift by 180 degrees, therefore, energy of light beam which changes in phase and energy of light beam which does not change in phase counteract each other completely, a problem of light leakage does not arise, and display effect of a display panel can be further improved.

For example, as illustrated in FIG. 2a, a color filter layer 35 is disposed on a second base substrate 20' of an opposed substrate 42, the color filter layer 35 is configured to filter light, so as to achieve color image display.

Figure 3:
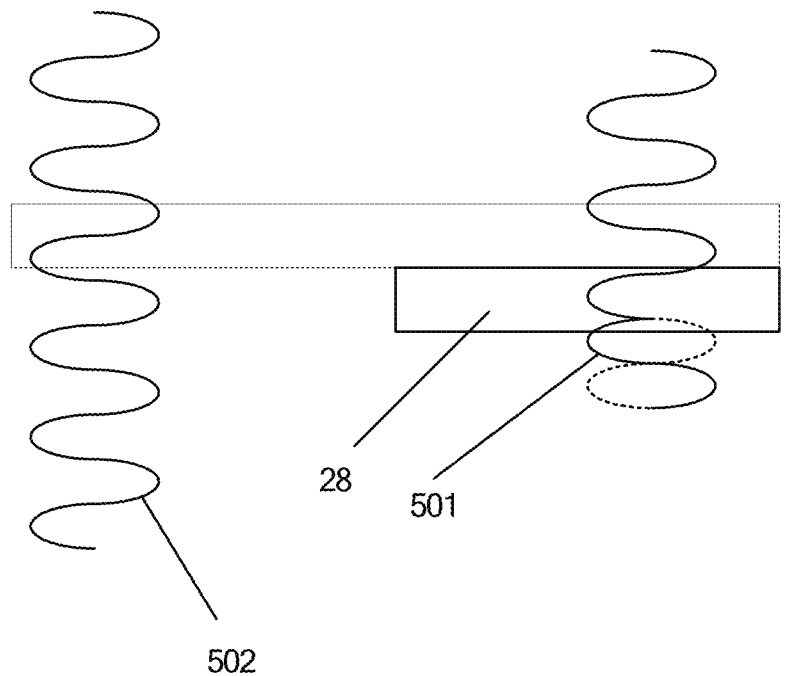
FIG. 3 is a schematic view illustrating a working principle of a phase shift layer.

For example, FIG. 3 is a comparison schematic view of light before and after phase shift. If no phase shift layer is provided, as illustrated at a left portion of FIG. 3, light is transmitted directly, no phase shift arises. If a phase shift layer is provided, as illustrated at a right portion of FIG. 3, phase of light passing through the phase shift layer 28 changes, for example, the phase shifts by 180 degrees. In order to distinguish easily, light beam arising phase shift is labeled 501. Therefore, by providing the phase shift layer, an aim to counteract energy of light beam 501 which changes in phase and energy of light beam 502 which does not change in phase can be realized.

For example, a working principle of a phase shift layer to allow light to undergo phase shift can refer to FIG. 3, for example, an formula is as follows:

$$\Delta\phi=2\pi(n-1)d/\lambda$$

Wherein $\Delta\phi$ is a phase (for example, $\Delta\phi$ is $\pi$), $\lambda$ is a wavelength, n is an index of refraction, d is a thickness of a phase shift layer.

For example, in an example of the embodiment, a black matrix 30 is disposed at the non-display area 002, an orthographic projection of the black matrix 30 on the array substrate 41 covers an orthographic projection of the phase shift layer 28 on the array substrate 41. For example, the black matrix is disposed on the opposed substrate 42. For example, the black matrix 30 is disposed on the second base substrate 20' of the opposed substrate 42.

For example, in an example of the embodiment, the array substrate 41 includes a first base substrate 20, and an orthographic projection of the phase shift layer 28 on the first base substrate 20 coincides with an orthographic projection of the black matrix 30 on the first base substrate 20.

An orthographic projection of the phase shift layer 28 on the first base substrate 20 coincides with an orthographic projection of the black matrix 30 on the first base substrate 20, which means that an orthographic projection of the phase shift layer 28 on the first base substrate 20 covers just an orthographic projection of the black matrix 30 on the first base substrate 20. In this way, when a display panel displays pictures and light beam is incident on the first base substrate 20, light leakage by the sub-pixel can be well avoided. Meanwhile, no more light shielding is increased, and no more shadow is formed. Therefore, a problem of color cast when a TFT-LCD displays a pure color picture is solved.

For example, in an example of the embodiment, the phase shift layer 28 is located above all layers at a side of the array substrate 41 close to the liquid crystal layer 50. In this way, when a display panel displays pictures and light beam is incident on the second base substrate 20, light leakage by the sub-pixel can be well avoided. Meanwhile, no more light shielding is increased, and no more shadow is formed. Therefore, a problem of color cast when a TFT-LCD displays a pure color picture is solved.

For example, the above-mentioned display panel can be applied to a display panel of twisted nematic (TN) mode, and can also be applied to a display panel of advanced-super dimensional switching (ADS) mode.

Figure 2B:
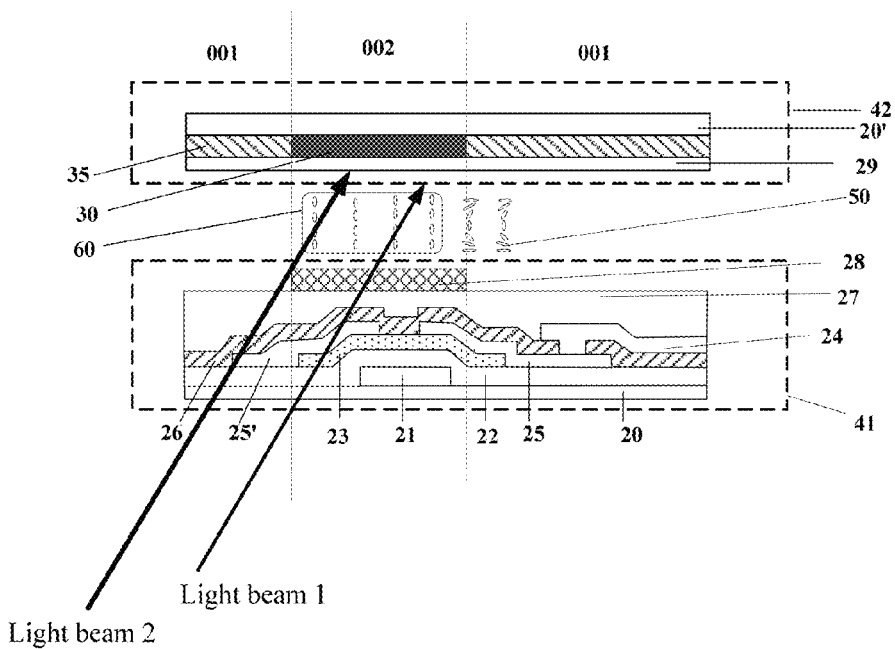
FIG. 2b is a sectional structure schematic view of another display panel provided by an embodiment of the invention.

In a case that the above-mentioned display panel is applied to a display panel of twisted nematic (TN) mode, as illustrated in FIG. 2b, a common electrode 29 is disposed on the opposed substrate 42, a pixel electrode 24 is disposed on the array substrate, the pixel electrode 24 and the common electrode 29 disposed on the opposed substrate 42 form an electric field to control liquid crystals to rotate, and the phase shift layer 28 is located on a layer where the pixel electrode 24 is located.

By forming a phase shift layer on a pixel electrode layer, when light beam is incident on the array substrate, phase shift is generated when light passes through the phase shift layer, for example, the phase shifts by 180 degrees, energy of light whose phase have been shifted counteracts energy of light beam which does not pass through the phase shift layer, therefore, light leakage can not arise, and then a problem of color cast when a TFT-LCD displays a pure color picture is solved.

For example, with regard to a display panel of twisted nematic (TN) mode, the phase shift layer 28 is insulated from the pixel electrode 24. A bias voltage is applied to the phase shift layer 28 and configured to drive liquid crystals in an area (an area corresponding to the phase shift layer) which is covered by the phase shift layer 28 to rotate and retain vertical, together with the common electrode 29 disposed on the opposed substrate 42, so that alignment of liquid crystals in the non-display area is controlled, and liquid crystals in the non-display area is kept at the normal black state when power is on. Therefore, light leakage can be well avoided, and contract ratio of a liquid crystal display panel is improved.

In a case that the above-mentioned display panel is applied to a display panel of ADS mode, a first transparent electrode and a second transparent electrode are disposed on the array substrate, the first transparent electrode is away from the liquid crystal layer, the second transparent electrode is close to the liquid crystal layer, the phase shift layer is located on the second transparent electrode.

Figure 2C:
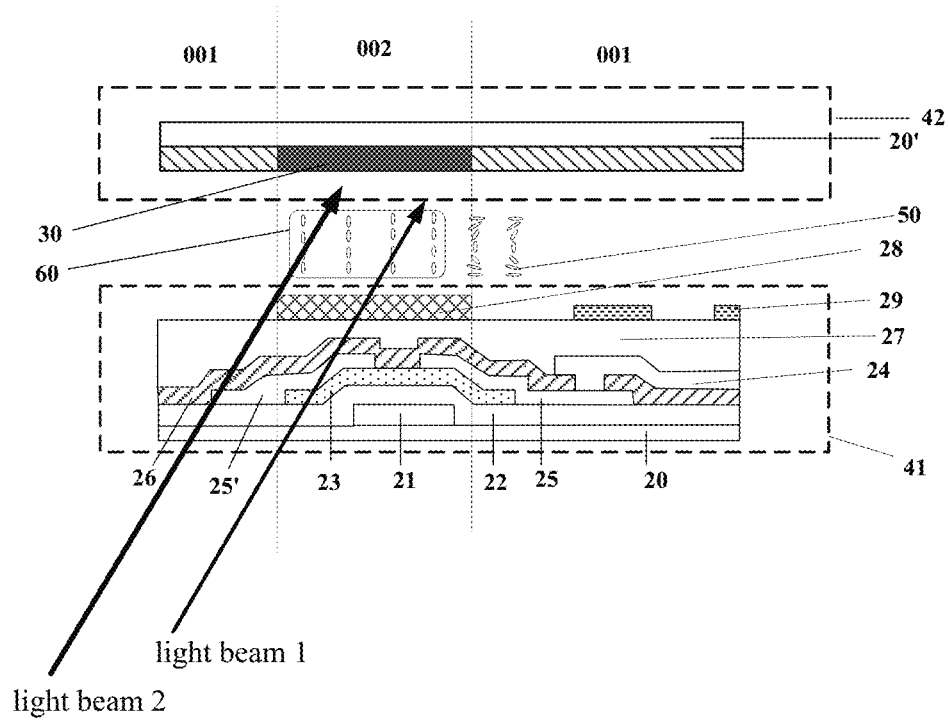
FIG. 2c is a sectional structure schematic view of another display panel provided by an embodiment of the invention (a sectional view along line B-B' of FIG. 1c)

For example, in a case that the above-mentioned display panel is applied to a display panel of HADS mode, the first transparent electrode is a pixel electrode, the second transparent electrode is a common electrode. In a case that the above-mentioned display panel is applied to a display panel of ADS mode, the first transparent electrode is a common electrode, the second transparent electrode is a pixel electrode. FIG. 2c is a schematic view of a display panel of HADS mode provided by an embodiment of the invention.

In order to better illustrate the solutions of the embodiments and the position of the phase shift layer, FIG. 2a provides an array substrate of a display panel includes the following layers sequentially disposed on a first base substrate 20: a gate electrode 21, a gate insulating layer 22, an active layer 23, a source electrode 25' and a drain electrode 25, a first passivation layer 26, a pixel electrode 24, a second passivation layer 27 and a phase shift layer 28 located on the second passivation layer 27. It is to be noted that, the phase shift layer 28 can also be disposed on a layer where the pixel electrode is located, and then the second passivation layer 27 is not necessary. In the display panel provided by the embodiment, a material of the phase shift layer can be a material capable of shifting the phase of light beam, for example, an alloy of silicon and molybdenum et al., limitations are not imposed thereto. The following embodiments can be the same as that.

For example, in an example of the embodiment, forming the phase shift layer in the array substrate includes: forming a phase shift thin film by a magnetron sputtering process, and patterning the phase shift thin film to form a pattern of the phase shift layer by a photolithography process.

Correspondingly, the embodiment also provides a display device including any one of the display panels of the embodiments.

For example, the display device can include any products or components having display function as follows: liquid crystal displays, liquid crystal televisions, digital photo frames, mobile phones, watches or tablet computers or the like.

Second Embodiment

The embodiment provides a manufacturing method of the display panel including the following steps.

Step 1: an array substrate is formed, and a phase shift layer is formed on the array substrate.

The phase shift layer is located at a non-display area of the array substrate and configured to allow light passing through the phase shift layer to undergo phase shift.

Step 2: an opposed substrate is formed, and the array substrate with the phase shift layer formed thereon and the opposed substrate is cell-assembled.

For example, in an example of the embodiment, with regard to a display panel of TN mode, forming the array substrate includes: providing a first base substrate; forming a thin film transistor on the first base substrate, forming the thin film transistor including forming a gate layer, a gate insulating layer, an active layer and a source/drain electrode layer; forming a pixel electrode layer on the thin film transistor; forming a phase shift layer on the pixel electrode layer; and forming the opposed substrate including: providing a second base substrate; forming a common electrode layer on the second base substrate.

For example, in an example of the embodiments, with regard to a display panel of ADS mode, forming the array substrate includes: providing a first base substrate; forming a thin film transistor on the first base substrate; forming a first transparent electrode layer on the thin film transistor; forming a second transparent electrode layer on the first transparent electrode layer; and forming a phase shift layer on the second transparent electrode layer.

Figure 4:
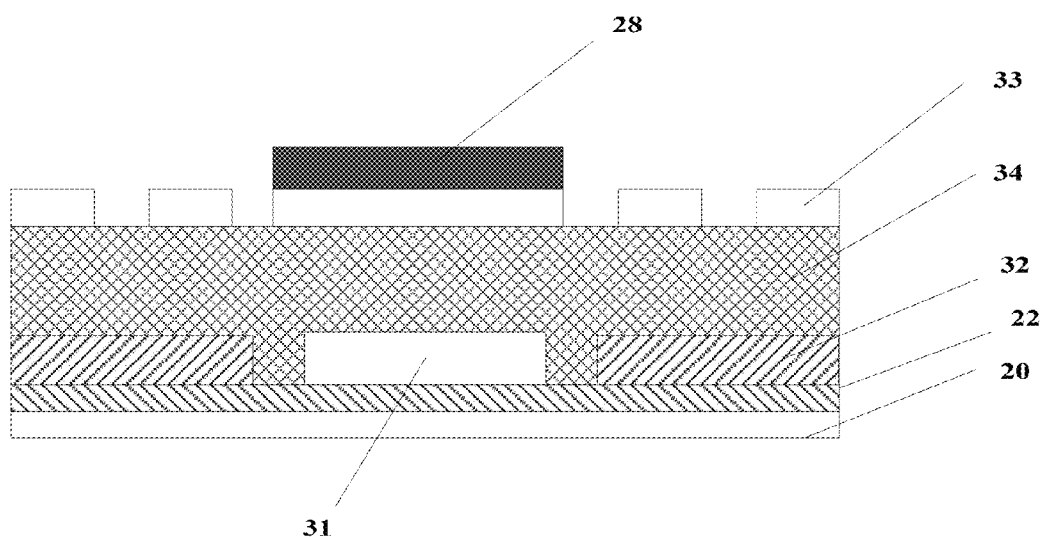
FIG. 4 is a sectional structure schematic of a display panel provided by an embodiment of the invention.

As illustrated in FIG. 4, the array substrate includes following layers on a first base substrate 20: a gate insulating layer 22 (a structure of a thin film transistor can refer to FIG. 1a and FIGS. 2a-2c), a first transparent electrode layer 32, a passivation layer 34 and a second transparent electrode layer 33 located on the passivation layer 34, and a phase shift layer 28 located on the second transparent electrode layer 33. A data line 31 is located at an area covered by the phase shift layer 28. The data line 31 is electrically connected with the source electrode 25' of the thin film transistor. For example, the thin film transistor includes a gate electrode 21, a gate insulating layer 22, an active layer 23, a source electrode 25' and a drain electrode 25.

For example, with regard to the ADS mode, a first transparent electrode is a common electrode, a second transparent electrode is a pixel electrode; with regard to the HADS mode, a first transparent electrode is a pixel electrode, a second transparent electrode is a common electrode.

Taking a display panel with a TN mode as an example, the manufacturing method thereof includes following steps.

A thin film transistor is formed on a first base substrate, for example, the first base substrate can be a transparent glass base substrate or silicon base substrate. The thin film transistor includes a gate layer, a gate insulating layer, an active layer, a source/drain electrode layer. The gate layer is subject to an exposure process, a development process, an etching process, and a striping process to form a gate electrode. The source/drain electrode layer is subject to an exposure process, a development process, an etching process, and a striping process to form a source electrode and a drain electrode.

A pixel electrode is formed on the thin film transistor, the pixel electrode layer is subject to a patterning process to form a pixel electrode, and the pixel electrode is connected with the drain electrode of the thin film transistor.

A phase shift layer is formed on the pixel electrode layer.

A film of a phase shift layer is formed by a magnetron sputtering process, and the film is subject to an exposure process, a development process, an etching process, and a striping process to form a phase shift layer at a non-display area on the array substrate.

For example, a material of the phase shift layer is MoSiON, but is not limited thereto.

An opposed substrate is formed, forming the opposed substrate includes forming a common electrode on a second base substrate, and cell-assembling the array substrate with the phase shift layer formed thereon and the opposed substrate to form a display panel. The display panel formed can be illustrated by FIG. 2b.

The display panel manufactured by the embodiment, a phase shift layer is disposed at a non-display area of the display panel and configured to allow light passing through to undergo phase shift. A light leakage problem can be solved by the display panel provided with the phase shift layer. The reasons for light leakage include: when a cell-assembling process is performed, alignment error arises in a normal operating process. Light emitted by the backlight source is incident at an inclined angle, and light is transmitted and refracted after passing through the array substrate, and then a light leakage problem arises.

In the display panels provided by the embodiments of the invention, a phase shift layer is disposed at a non-display area of the array substrate, the phase shift layer is configured to allow light passing through the phase shift layer to undergo phase shift. Light is reflected or transmitted after being incident on the array substrate of the display panel, the phase shift layer allows light reflected or transmitted to be shifted phase. In this way, energy (light strength) of light beam whose phase have been shifted counteracts energy (light strength) of light beam which does not undergo phase shift, therefore, a light leakage problem can not arise, and then a color cast problem exists when a TFT-LCD displays a pure picture and introduced by color cross when the display panel is viewed at a side angle is solved.

The following tips are to be noted.

(1) Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components.

(2) Only the structures involved in the embodiments of the present invention are involved in the embodiments and drawings of the present invention, other structures can refer to usual designs.

(3) In order to clearly illustrate, a layer or an area may be amplified in the drawings of the embodiments of the present invention. It is to be understood that, when a member such as a layer, a film, an area or a substrate is located or disposed on or below another member, the member can be located or disposed on or below the another member directly, or an intermediate member or intermediate member(s) can be disposed.

(4) The display panels with different modes provided by the embodiments of the present invention are used to take as examples to be fully understood, and limitations are not imposed thereto.

(5) The features in different embodiments or the features in the same embodiments can be combined without conflict.

What have been described above are only specific implementations of the present disclosure, the protection scope of the present disclosure is not limited thereto. Any modifications or substitutions easily occur to those skilled in the art within the technical scope of the present disclosure should be within the protection scope of the present disclosure. Therefore, the protection scope of the present disclosure should be based on the protection scope of the claims.

This application claims the benefit of priority from Chinese patent application No. 201510320668.9, filed on Jun. 11, 2015, the disclosure of which is incorporated herein in its entirety by reference as a part of the present application.

What is claimed is:

1. A display panel comprising an array substrate and an opposed substrate that are opposite to each other, and a liquid crystal layer located between the array substrate and the opposed substrate, wherein the display panel comprises a display area and a non-display area, a phase shift layer is disposed at an area corresponding to the non-display area of the array substrate, and the phase shift layer is configured to shift a phase of light passing through the phase shift layer, and wherein a black matrix is disposed at the non-display area, and an orthographic projection of the phase shift layer on the array substrate coincides with an orthographic projection of the black matrix at the non-display area on the array substrate.

2. The display panel according to claim 1, wherein the phase shift layer is located above all layers at a side of the array substrate close to the liquid crystal layer.

3. The display panel according to claim 1, wherein a common electrode is disposed on the opposed substrate, a pixel electrode is disposed on the array substrate, and the phase shift layer is located above a layer where the pixel electrode is located.

4. The display panel according to claim 3, wherein the phase shift layer is insulated from the pixel electrode, and a bias voltage is applied to the phase shift layer to drive liquid crystals in an area covered by the phase shift layer to rotate.

5. The display panel according to claim 1, wherein a first transparent electrode and a second transparent electrode are disposed on the array substrate, the first transparent electrode is away from the liquid crystal layer, the second transparent electrode is close to the liquid crystal layer, the phase shift layer is located above the second transparent electrode.

6. The display panel according to claim 5, wherein the first transparent electrode is a pixel electrode, the second transparent electrode is a common electrode, or the first transparent electrode is a common electrode, the second transparent electrode is a pixel electrode.

7. A display device comprising the display panel according to claim 1.

8. The display device according to claim 7, wherein a black matrix is disposed at the non-display area, and an orthographic projection of the phase shift layer on the array substrate coincides with an orthographic projection of the black matrix at the non-display area on the array substrate.

9. The display device according to claim 7, wherein the phase shift layer is located above all layers at a side of the array substrate close to the liquid crystal layer.

10. The display device according to claim 7, wherein a common electrode is disposed on the opposed substrate, a pixel electrode is disposed on the array substrate, and the phase shift layer is located above a layer where the pixel electrode is located.

11. The display device according to claim 10, wherein the phase shift layer is insulated from the pixel electrode, and a bias voltage is applied to the phase shift layer to drive liquid crystals in an area covered by the phase shift layer to rotate.

12. The display panel according to claim 1, wherein the phase shift layer is located above all layers at a side of the array substrate close to the liquid crystal layer.

13. The display panel according to claim 1, wherein a common electrode is disposed on the opposed substrate, a pixel electrode is disposed on the array substrate, and the phase shift layer is located above a layer where the pixel electrode is located.

14. The display panel according to claim 1, wherein a first transparent electrode and a second transparent electrode are disposed on the array substrate, the first transparent electrode is away from the liquid crystal layer, the second transparent electrode is close to the liquid crystal layer, the phase shift layer is located above the second transparent electrode.

15. A manufacturing method of the display panel comprising:
    forming an array substrate, and forming a phase shift layer on the array substrate, the phase shift layer being located at a non-display area of the array substrate and configured to shift a phase of light passing through the phase shift layer;
    forming an opposed substrate, and cell-assembling the array substrate with the phase shift layer formed thereon and the opposed substrate,
    wherein a black matrix is disposed at the non-display area, and an orthographic projection of the phase shift layer on the array substrate coincides with an orthographic projection of the black matrix at the non-display area on the array substrate.

16. The manufacturing method of the display panel according to claim 15, wherein
    forming the array substrate comprises:
    providing a first base substrate;
    forming a thin film transistor on the first base substrate;
    forming a pixel electrode layer on the thin film transistor;
    forming a phase shift layer above the pixel electrode layer; and
    forming the opposed substrate comprises:
    providing a second base substrate;
    forming a common electrode layer on the second base substrate.

17. The manufacturing method of the display panel according to claim 15, wherein forming the array substrate comprises:
    providing a first base substrate;
    forming a thin film transistor on the first base substrate;
    forming a first transparent electrode layer on the thin film transistor;
    forming a second transparent electrode layer on the first transparent electrode layer;
    forming a phase shift layer above the second transparent electrode layer.

18. The manufacturing method of the display panel according to claim 17, wherein a first transparent electrode is a pixel electrode, a second transparent electrode is a common electrode, or a first transparent electrode is a common electrode, a second transparent electrode is a pixel electrode.

19. The manufacturing method of the display panel according to claim 15, wherein a material of the phase shift layer is MoSiON.

* * * * *